March 26, 1968 R. M. BONIGER 3,374,503
MEANS FOR MOLDING A GRIP OR THE LIKE
Filed May 5, 1964 2 Sheets-Sheet 1
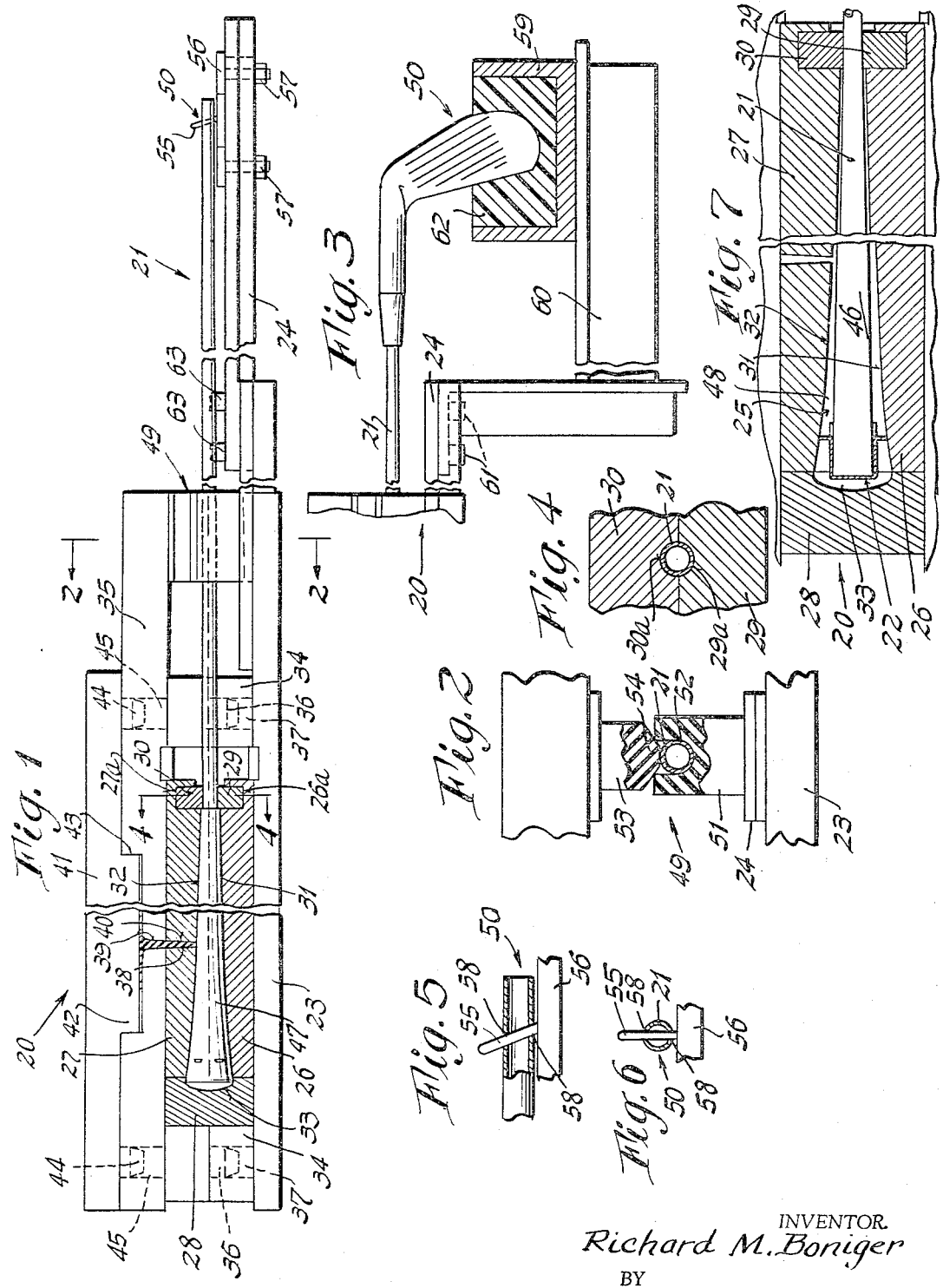
INVENTOR.
Richard M. Boniger
BY
Johnson and Kline
ATTORNEYS March 26, 1968 R. M. BONIGER 3,374,503
MEANS FOR MOLDING A GRIP OR THE LIKE
Filed May 5, 1964 2 Sheets-Sheet 2
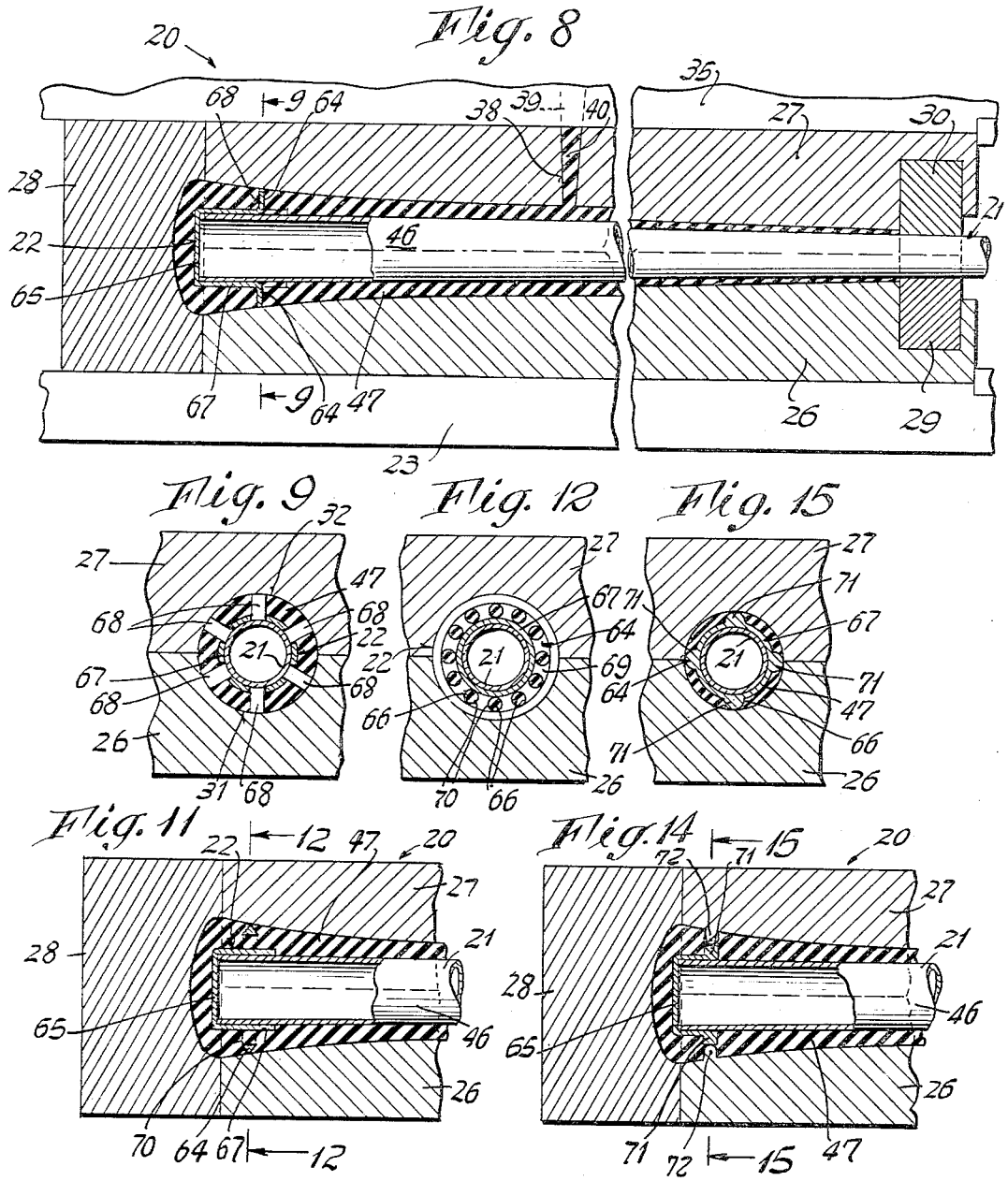
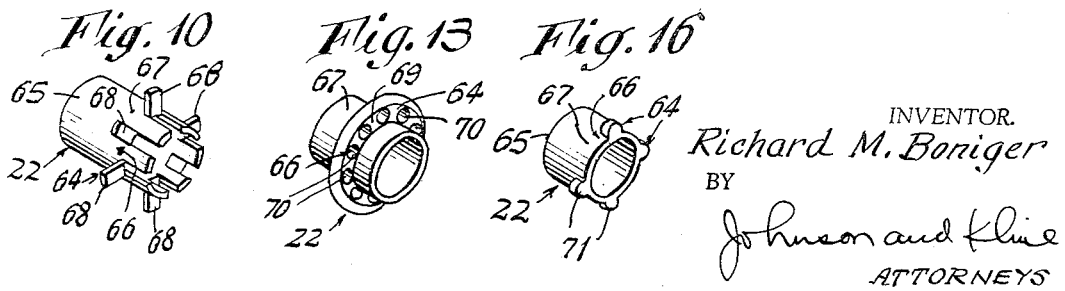
INVENTOR.
Richard M. Boniger
BY
Johnson and Kline
ATTORNEYS

United States Patent Office 3,374,503
Patented Mar. 26, 1968

3,374,503
MEANS FOR MOLDING A GRIP OR THE LIKE
Richard M. Boniger, Westfield, Mass., assignor to A. G. Spalding & Bros., Inc., Chicopee, Mass., a corporation of Delaware
Filed May 5, 1964, Ser. No. 364,903
11 Claims. (Cl. 18—36)

ABSTRACT OF THE DISCLOSURE

An apparatus for injection molding a grip on the end of a hollow golf shaft wherein a free end of the shaft is inserted in a mold and is oriented and held against longitudinal movement and has a cap closing the end of the shaft, which cap is provided with a skirt overlying the side of the shaft and having projections for engaging the mold to prevent lateral movement of the end of the shaft with the projections providing passages for the moldable material as it is forced into the mold cavity to enable a completely closed grip to be molded thereon while the end of the shaft is held against longitudinal and lateral movement under the pressures of the injected material.

---

This invention relates to means for molding a grip or the like on an elongate member. More specifically, it pertains to the positioning and retaining of the elongate member relative to the molding apparatus and to the ultimate article of manufacture that is formed.

Heretofore, grips or the like have been molded on portions of elongate members, such as golf club shafts, by various means, but such means have proven unsatisfactory for producing the desired end or have resulted in a finished article of manufacture having undesirable characteristics.

According to one prior method, the means for molding the grip on the elongate member required that the hollow end of the member be utilized to receive a pin or the like for positioning and retaining the end portion of the member, on which the grip was to be molded, during the molding operation. This means, while it successfully aligned and retained the end portion in position under molding pressures, had the failing that a subsequent operation was required to close the end of the elongate member upon removal of the positioning pin therefrom.

Another prior method, while utilizing means which provided a grip that closed the open end of the elongate member, relied, for positioning and retaining the end portion of the member in the molding chamber, upon a spacer ring secured to the member substantially midway of the grip receiving end portion thereof. This method, which was commonly used in compression molding operations, had the fault that the spacer ring, which of necessity was substantially rigid and incompressible, was embedded in the resultant molded grip in the gripping area thereof, thus substantially reducing the utility of the grip by presenting an obstacle to gripping, as when the elongate member comprised the shaft of a golf club. Further, the use of spacer rings or similar means, positioned as above described, was time consuming in that they required careful positioning, limiting of the molding procedures utilized in that they served as an obstruction in transfer or injection molding and costly in that additional operation steps were still required for capping the open end of the elongate member prior to molding.

The present invention overcomes the problems aforenoted and provides an improved means for molding grips and the like on end portions of elongate members.

It is an object of the invention to provide means for molding a grip on an elongate member which accurately aligns and orients the member relative to the molding apparatus and retains the grip receiving portion thereof in fixed position in the molding chamber, while substantially reducing the cost of the molding operation and producing an article of manufacture having the desired characteristics.

It is also an object of the invention to provide a means for molding grips in a predetermined manner on an end portion of an elongate member, which is adaptable to substantially all types of molding operations and reduces the cost of molding by reducing the number of steps required.

It is also an object of the invention to provide in the molding of a grip on an end portion of an elongate member where such end portion forms a part of the molding cavity, means for accurately positioning the end portion in the cooperating molding chamber and thereafter retaining it in such position, the positioning and retaining means being mounted on the end portion to become part of the finished article without adversely changing its characteristics.

Another object of the invention is to provide in the molding of a grip on an end portion of an elongate member, where the end portion forms part of the molding cavity in cooperation with a molding chamber, means spaced from the molding chamber for orienting the elongate member relative thereto in a predetermined manner and preventing axial displacement thereof during the molding operation.

Still another object of the invention is to provide means for positioning the end portion of an elongate hollow member in a molding chamber and retaining it against lateral displacement under the pressure of moldable material being force fed therein, such positioning and retaining means being mounted on the end portion of the member to become part of the finished molded article and close the open end thereof.

Yet another object of the invention is to provide means in the form of a cap or sleeve mounted on the outer end of an end portion of an elongate member which has laterally projecting means for engagement with the walls of a molding chamber in which the end portion is positioned, at predetermined points around the end portion, for accurately positioning the end portion and preventing its lateral displacement during a grip molding operation, the laterally projecting means providing passages to enable moldable material to flow therearound so that a grip having a closed end is formed on the elongate member.

It is further an object of the invention to provide means for molding a grip or the like on an end portion of an elongate member which includes means mounted on the end portion for positioning the latter in a molding chamber in a predetermined manner and preventing lateral displacement thereof during the molding operation, such positioning means being self-positioning on the outer end of the end portion, thus reducing cost of assembly, and forming part of the finished grip without adversely affecting its characteristics.

Other objects and advantages of the invention will be apparent from the specification and claims, when considered in connection with the attached sheets of drawings, illustrating one form of the invention, wherein like characters represent like parts and in which:

FIGURE 1 is a side elevational view, partially in section, of a molding apparatus, according to the invention;

FIG. 2 is a fragmentary view, broken away and partially in section, taken in the direction of the arrows 2—2 in FIG. 1;

FIG. 3 is a fragmentary foreshortened side elevational view, partially in section, of a portion of a modification of the molding apparatus, according to the invention;

FIG. 4 is a fragmentary cross-sectional view taken in the direction of the arrows 4—4 in FIG. 1.

FIG. 5 is a fragmentary view, broken away, of the orienting portion of the apparatus shown in FIG. 1;

FIG. 6 is a fragmentary end view, partially in cross-section of the portion of the apparatus of FIG. 1 shown in FIG. 5;

FIG. 7 is a fragmentary sectional side elevational view of the molding apparatus of FIG. 1 prior to the molding operation;

FIG. 8 is a fragmentary sectional view of the molding means of FIG. 1, according to one form of the invention;

FIG. 9 is a fragmentary cross-sectional view taken in the direction of the arrows 9—9 in FIG. 8;

FIG. 10 is a perspective view of part of the molding means of FIG. 8;

FIG. 11 is a fragmentary sectional view of another form of molding means, according to the invention;

FIG. 12 is a fragmentary cross-sectional view taken in the direction of the arrows 12—12 in FIG. 11;

FIG. 13 is a perspective view of part of the molding means of FIG. 11;

FIG. 14 is a fragmentary sectional view of still another form of molding means, according to the invention;

FIG. 15 is a fragmentary cross-sectional view taken in the direction of the arrows 15—15 in FIG. 14; and FIG. 16 is a perspective view of part of the molding means of FIG. 14.

Referring now to the drawings, and FIGS. 1 to 7 in particular, the invention in means for molding a grip or the like on an elongate member is shown including a molding apparatus 20, an elongate member 21 and holding or centering means 22 for positioning and retaining the portion of the elongate member to receive the grip in a predetermined position relative to the molding apparatus.

As used herein and throughout the claims the term "grip" is intended to include finished grips, such as found on golf clubs, tennis rackets, hammers or the like, and grip foundations over which a wrap or similar finishing cover must be applied. While the term "elongate member" is here illustrated and described in connection with golf club shafts, it should be understood that the concepts of the invention are applicable equally as well to the formation of a grip on an end portion of any other form of elongate member.

As illustrated, the molding apparatus 20, which is shown as a transfer molding device, includes a base 23 having a base extension 24 connected thereto. The base supports a plurality of separable molding members, as is well known in the art, for defining a molding chamber 25, the molding members including a first member 26 connected to the base, a second member 27 movable into engagement with the first member, an end bar 28 engageable with the first and second members and bars 29 and 30 connected respectively to the first and second members.

The first and second molding members, which are relatively movable into and out of engagement in any known manner, are formed with complementary cavities 31 and 32 defining side walls of the molding chamber 25, having a shape corresponding to the shape of the long dimension of the ultimate grip to be formed. The end bar 28 is formed with a cavity 33, having the shape of the closed end of the ultimate grip to be formed for defining the outer end of the molding chamber. The bars 29 and 30, which are secured in recesses 26a and 27a in their respective molding members 26 and 27, are formed with complementary grooves 29a and 30a adapted, on the molding chamber being closed, to grip the elongate member 21 and thus define the inner end of the molding chamber 25. The molding members, which cooperate when engaged in molding position, as shown in FIGS. 1 and 7, to provide the molding chamber 25 are mounted or carried by supporting blocks 34 and 35, which are aligned in the engaged position of the molding members by pins 36 or the like received in openings 37.

The second molding member 27, which is here illustrated as the upper movable member, is formed with one or a plurality of openings 38 (only one of which is shown in the drawings) extending therethrough and opening into the molding chamber 25 through a side wall thereof. The block 35, mounting the molding member 27, also is formed with an opening or openings 39, such openings being aligned with the openings 38 to provide a passage or passages through which moldable material 40 (see FIG. 1) may be fed under the pressure of a plunger 41 or the like. The plunger, which includes a leading portion 42 adapted to be received in a recess or moldable material reservoir 43 formed in the block 35, is aligned relative to the block by the engagement of pins 44 in openings 45.

The molding chamber 25 is adapted to receive the end portion 46 of elongate member 21, over which the grip 47 is to be molded, and cooperates therewith to define the molding cavity 48 (see FIG. 7), the cavity being of the size and shape of the resultant grip to be formed. In order to orient and position the elongate member 21 relative to the molding apparatus 20, so that a predetermined relationship is established between the end portion 46 and the molding chamber 25 for defining the molding cavity 48, the molding apparatus is provided with member clamping means 49 and orienting means 50. The clamping and orienting means, which may be modified depending on the shape, size or character of the elongate member 21, in addition to positioning the elongate member also prevent its axial displacement under the pressures produced during the molding operation.

Referring to FIGS. 1 and 2, the clamping means 49 is shown comprising a block 51 of resilient material mounted on the base 23, the block being formed with a groove or channel 52 in its upper surface adapted to receive the elongate member 21 and position it in a predetermined manner relative to the molding chamber. A second resilient block 53, having a tapered leading end 54 adapted to at least partially enter channel 52, is carried by and movable with mold member supporting block 35 for pressing the elongate member 21 into the channel when the molding members are engaged to form the molding chamber. It should be noted that by forming the clamping means 49 of resilient material the desired positioning and retaining pressure is applied to the elongate member without crushing or otherwise deforming it.

The member orienting means 50 is shown in the drawings in two different forms. In FIG. 1, where the elongate member 21 is shown as the shaft of a golf wood, the orienting means comprises a pin 55 mounted in a block 56 adjustably connected to base extension 24 by means of nut and bolt connections 57. The pin, which is adjustable relative to the base extension to facilitate mounting the golf shaft or to accommodate shafts of different lengths, is inclined in the direction of the molding apparatus 20 to prevent axial displacement or bowing of the shaft to which the pin is connected, under the pressure created during the molding operation. Prevention of shaft bowing or axial displacement is accomplished by means of the connection between the shaft and the pin, the latter being received in a predetermined inclined opening formed in the shaft or in offset openings 58 where the shaft is hollow, as shown in the drawings, for exerting pressure on the shaft in a direction opposed to the direction in which the shaft would normally tend to bow. The orienting pin is so positioned relative to the molding chamber 25 that its connection to the shaft predeterminately orients the shaft with respect to the chamber, so that the grip 47 is molded on the shaft in the desired manner.

In FIG. 3, the orienting means 50 is shown in a form for use in molding grips on the shafts of golf irons, which have the club heads connected thereto. In this form, the orienting means comprises a receptacle 59 or the like mounted on a bracket 60 connected, by machine screws 61, to the base extension 24. The receptacle, which is filled with a hardenable plastic or similar material 62, is adapted to receive a portion of the club head, prior to the plastic hardening, so that the head is held in predetermined position, thus orienting the shaft.

In order to supplement the clamping means 49 and orienting means 50, for positioning and supporting the elongate member 21, braces 63 may be provided on the base or base extension for engagement with unsupported portions of the elongate member.

While the orienting means 50, clamping means 49 and molding member bars 29 and 30 predeterminately position the elongate member 21 with respect to the molding chamber, so that the molding cavity 48 initially has the desired size and shape, the unsupported end portion 46 will be laterally displaced under molding pressures, thus changing the shape of the cavity, unless support is provided therefor within the cavity.

According to the present invention and as particularly illustrated in FIGS. 8 through 16, the unsupported end portion of elongate member 21 is positioned within molding chamber 25 and retained against lateral displacement therein by the holding or centering means 22. The centering means, which is preferably formed of a rigid incompressible material and is adapted to be embedded in the molded grip 47, is mounted on the end portion 46, closely adjacent the outer end thereof, and is provided with laterally projecting means 64 for engaging the side walls of the molding chamber 25 at predetermined points around the end portion.

While the centering means 22 may take the form of a sleeve or the like, particularly where the elongate member is a solid body, in the illustrated forms of the invention, where such member comprises a hollow body having open ends, the centering means comprises a cap 65 positioned on the end portion to close the open end.

According to the invention, in order to enable the moldable material 40 to flow over the cap and provide a grip having a closed molded end, without resorting to a second molding operation, the laterally projecting means 64 is formed to provide passages 66 between the cap and the walls of the molding chamber.

In FIGS. 8 through 10 the centering or holding means 22 is shown in a form where the skirt 67 of the cap is slit to form integral outwardly turned radially spaced tongues or projections 68 forming the laterally projecting means, the spaces between the tongues constituting the passages 66. In the form of the centering means shown in FIGS. 11 through 13, the laterally projecting means 64 comprises an integral rib 69 formed on the skirt 67 of the cap. In this construction, the passages 66 comprise radially spaced openings 70 formed through the rib.

In FIGS. 14 through 16, while the centering means 22 is similar to the form shown in FIGS. 8 through 10, in that radially spaced projections 71 formed integral with the skirt 67 form the laterally projecting means and the spaces between the projections constitute the passages 66, this form differs in that the molding members 26 and 27 are formed with an inwardly projecting, integral circumferential rib 72 for centering and holding engagement with the laterally projecting means. This construction, on removal of the elongate member from the molding apparatus, provides a grip having a circumferential groove therein at one end for receiving an O-ring or the like, as desired.

In accordance with the invention, and the various forms thereof described, it will be seen that means are provided for molding a grip on an end portion of an elongate member which produces an article of manufacture having the rigid incompressible centering part of the molding means embedded in the grip, but out of the gripping area thereof.

Thus, among others, the several objects and advantages of the invention, as aforenoted, are achieved. Numerous changes in construction may be resorted to without departing from the spirit of the invention as defined in the claims.

I claim:
1. Means for molding a grip or the like on an end portion of an elongate member comprising a molding apparatus including a plurality of molding members, said members cooperating to form an elongate molding chamber having predetermined side walls, means for feeding a moldable material into said chamber, means mounting an elongate member with a free end portion thereof passing into and disposed within the chamber in spaced relation to the side walls thereof, means holding the end portion of the elongate member in predetermined position in the chamber for defining between said end portion and the surface of the chamber a molding cavity of the size and shape of the ultimate grip to be molded for receiving said moldable material, said holding means comprising means to hold the member against longitudinal movement and an end cap mounted on said end portion of the elongate member and having a skirt provided with laterally projecting means closely adjacent the end thereof engaging the side walls of said chamber at predetermined points around the end portion to hold said end portion in position and against lateral displacement by the material forced into the molding cavity, said centering member having passages in the laterally projecting means to enable the material fed into the molding cavity to flow around the unobstructed end of the end portion to form a closed grip on the end of said elongate member.

2. The invention as defined in claim 1 wherein said laterally projecting means comprises a plurality of radially spaced tongue portions formed integral with said skirt and projecting normal to the longitudinal axis thereof, the spaces between said tongues defining passages to enable the material fed into the molding cavity to flow around the end of the unobstructed end portion to form a closed grip on the end of said elongate member.

3. The invention as defined in claim 1 wherein said laterally projecting means comprises a circumferential rib carried by said skirt and projecting outwardly thereof, said rib being formed with a plurality of transverse passages therethrough to enable the material fed into the molding cavity to flow around the end of the unobstructed end portion to form a closed grip on the end of said elongate member.

4. The invention as defined in claim 1 wherein said laterally projecting means comprises a plurality of radially spaced protrusions formed integral with said skirt and projecting outwardly thereof normal to the longitudinal axis of said end portion and into engagement with a circumferential rib forming part of the side walls of said chamber, the spaces between said protrusions defining passages to enable the material fed into the molding cavity to flow around the unobstructed end of the end portion to form a closed grip on the end of said elongate member.

5. Means for molding a grip or the like on an end portion of an elongate member comprising a molding apparatus including a plurality of molding members, said members cooperating to form an elongate molding chamber having predetermined side walls, means forcibly feeding a molding material through means in said side walls and into said chamber, means mounting an elongate member on the molding apparatus with an end portion thereof inserted in and disposed within the chamber in spaced relation to the side walls thereof, said mounting means including a pin predeterminately mounted relative to said molding members, said pin being inclined toward said molding chamber and engageable in a predetermined opening formed in said elongate member for orienting said elongate member in a predetermined manner relative to said chamber and preventing axial displacement thereof when said moldable material is fed into said chamber, means holding the end portion of the elongate member in predetermined position in the chamber for defining between such end portion and the surface of the chamber a molding cavity of the size and shape of the ultimate grip to be molded for receiving said moldable material, such holding means comprising a centering member mounted on the end portion of the elongate member closely adjacent the outer end thereof and having a laterally projecting means engaging the side walls of said chamber at predetermined points around the end portion to hold said end portion in position and against lateral displacement by the material forced into the molding cavity, said laterally projecting means being formed with passages to enable the material fed into the molding cavity to flow around the end of the end portion to form a closed grip on the end of said elongate member.

6. Means for molding a grip or the like on an end portion of an elongate member comprising a molding apparatus including a base, a plurality of separable molding members carried by said base, at least two of said members being movable toward and away from each other, said molding members cooperating to form an elongate molding chamber having predetermined side walls, said movable molding members defining said side walls, means forcibly feeding a molding material through openings in said side walls and into said chamber, means mounting an elongate member with an end portion thereof disposed within the chamber in spaced relation to the side walls thereof, said mounting means including means for orienting said elongate member in a predetermined manner relative to said molding chamber and preventing axial displacement thereof during the molding operation, such means including a pair of relatively movable clamping members spaced from said molding chamber for clamping said elongate member in alignment with said molding chamber with one of said clamping members being connected to each of said movable molding members, said clamping members including a first resilient member having a groove therein in axial alignment with said molding chamber for receiving and seating said elongate member and a second resilient member providing a surface narrower than said groove for engaging a surface of said elongate member to press the latter into said groove, means holding the end portion of the elongate member in predetermined position in the chamber for defining between such end portion and the surface of the chamber a molding cavity of the size and shape of the ultimate grip to be molded for receiving said moldable material, such holding means comprising a centering member mounted on the end portion of the elongate member closely adjacent the outer end thereof and having a laterally projecting means engaging the side walls of said chamber at predetermined points around the end portion to hold said end portion in position and against lateral displacement by the material forced into the molding cavity, said laterally projecting means being formed with passages to enable the material fed into the molding cavity to flow around the end of the end portion to form a closed grip on the end of said elongate member.

7. Means for molding a grip or the like on an end portion of an elongate member comprising a molding apparatus including a base, a plurality of separable molding members carried by said base, at least two of said members being movable toward and away from each other, said molding members cooperating to form an elongate molding chamber having predetermined side walls, said movable molding members defining said side walls, means forcibly feeding a molding material through openings in said side walls and into said chamber, means mounting an elongate member with an end portion thereof disposed within the chamber in spaced relation to the side walls thereof, said mounting means including a pin predeterminately mounted on said base of said molding apparatus at a distance from said molding chamber, said pin being inclined toward said molding chamber and engageable in a predetermined opening formed in the end of said elongate member directed away from said end portion for orienting the elongate member relative to the molding chamber and preventing axial displacement thereof, such means also including relatively movable clamping members spaced from said molding chamber for clamping said elongate member in alignment with said molding chamber, one of said clamping members being connected to each of said movable molding members, means holding the end portion of the elongate member in predetermined position in the chamber for defining between such end portion and the surface of the chamber a molding cavity of the size and shape of the ultimate grip to be molded for receiving said movable material, such holding means comprising a centering member mounted on the end portion of the elongate member closely adjacent the outer end thereof and having a laterally projecting means engaging the side walls of said chamber at predetermined points around the end portion to hold said end portion in position and against lateral displacement by the material forced into the molding cavity, said laterally projecting means being formed with passages to enable the material fed into the molding cavity to flow around the end of the end portion to form a closed grip on the end of said elongate member.

8. Means for molding a grip or the like on the end portion of an elongate hollow member comprising a molding apparatus including a plurality of molding members, said molding members cooperating to form an elongate molding chamber having predetermined side walls, means forcibly feeding a molding material through openings in said side walls and into said chamber, means mounting an elongate tubular hollow member having open ends on said molding apparatus with a free end portion thereof extending into and disposed within the chamber in spaced relation to the side walls thereof, a cap member mounted on the said free end portion of the elongate member for closing the open end and having a skirt overlying the hollow member and provided with a laterally projecting means forming part of said cap member engaging the side walls of said chamber at predetermined points around the end portion to hold said end portion in position and against lateral displacement by the material forced into the molding cavity, said laterally projecting means being formed to provide passages to enable the material fed into the molding cavity to flow around the end of the unobstructed end portion and over said cap member to form a closed grip on the end of said elongate member.

9. Means for molding a grip or the like on an end portion of an elongate tubular hollow member comprising a molding apparatus including a plurality of molding members, said molding members cooperating to form an elongate molding chamber having predetermined side walls, means forcibly feeding a molding material through opening means in said side walls and into said chamber, means mounting an elongate hollow member having open ends with an end portion thereof disposed within the chamber in spaced relation to the side walls thereof, means holding the end portion of the elongate member in predetermined position in the chamber for defining between such end portion and the surface of said chamber a molding cavity of the size and shape of the ultimate grip to be molded for receiving said moldable material, such holding means comprising a cap mounted on the outer open end of the end portion for closing such open end, said cap being formed with a skirt overlying the sides of said hollow member with integral radially spaced protrusions extending normal to the longitudinal axis of said elongate member and engaging the side walls of said chamber at predetermined points around the end portion for holding said end portion in position and against lateral displacement by the material forced into the molding cavity, the spaces between said protrusions defining passages to enable the material fed into the molding cavity to flow around the end of the end portion and over the cap to form a closed grip on the end of said elongate member.

10. Means for molding a grip or the like on an end portion of an elongate hollow member comprising a molding apparatus including a plurality of molding members, said molding members cooperating to form an elongate molding chamber having predetermined side walls, means forcibly feeding a molding material through opening means in said side walls and into said chamber, means mounting an elongate hollow member having open ends with an end portion thereof extending into and disposed within the chamber in spaced relation to the side walls thereof, means holding the end portion of the elongate member in predetermined position in the chamber for defining between such end portion and the surface of the molding chamber a molding cavity of the size and shape of the ultimate grip to be molded for receiving said moldable material, such holding means comprising a cap mounted on the outer open end of the end portion for closing such open end, said cap being formed with a skirt overlying the sides of said hollow member with a circumferential rib extending outwardly thereof for engaging the side walls of said chamber at predetermined points around the end portion to hold said end portion in position and against lateral displacement by the material forced into the molding cavity, said rib being formed with a plurality of transverse passages to enable the material fed into the molding cavity to flow around the end of the end portion and over the cap to form a closed grip on the end of said elongate member.

11. Means for molding a grip or the like on an end portion of an elongate hollow member comprising a molding apparatus including a plurality of molding members, said molding members cooperating to form an elongate molding chamber having predetermined side walls, means forcibly feeding a molding material through opening means in said side walls and into said chamber, means mounting an elongate hollow member having open ends with an end portion thereof disposed within the chamber in spaced relation to the side walls thereof, said mounting means including means for orienting said elongate member in a predetermined manner relative to said chamber and preventing axial displacement thereof when said moldable material is fed into said chamber, said means imparting only sufficient force against said elongate member to orient it and prevent axial displacement without distorting said elongate member, means holding the end portion of the elongate member in predetermined position in the chamber for defining between such end portion and the surface of the chamber a molding cavity of the size and shape of the ultimate grip to be molded for receiving the moldable material, such holding means comprising a cap mounted on the outer open end of said end portion for closing such open end, said cap having a skirt overlying the sides of the hollow member with laterally projecting means forming part thereof for engaging the side walls of said chamber at predetermined points around the end portion to hold said end portion in position and against lateral displacement by the material forced into the molding cavity, said laterally projecting means being formed to provide passages to enable the material fed into the molding cavity to flow around the end of the end portion and over said cap to form a closed grip on the end of said elongate member.

References Cited
UNITED STATES PATENTS

| | | | |
|---|---|---|---|
| 2,376,085 | 5/1945 | Radford | 264—275 |
| 2,604,661 | 7/1952 | Karns | 264—275 |
| 3,090,999 | 5/1963 | Karns | 264—275 |
| 3,236,491 | 2/1966 | Keinänen | 264—275 |

FOREIGN PATENTS 1,163,009  2/1964  Germany.

ROBERT F. WHITE, *Primary Examiner.*

R. B. MOFITT, J. H. SILBAUGH,
*Assistant Examiners.*